United States Patent Office

2,978,330
Patented Apr. 4, 1961

2,978,330

METHODS FOR PRODUCING BAKED GOODS

Charles G. Ferrari, Evanston, Ill., assignor to J. B. Short Milling Company, Chicago, Ill., a corporation of Illinois No Drawing. Filed June 27, 1958, Ser. No. 744,907

2 Claims. (Cl. 99—90)

This invention relates to methods for preparing baked goods such as bread and to novel bread improver compositions useful therein.

In my copending application Serial No. 744,897, filed concurrently herewith, I have disclosed that it is possible to obtain improved bread improver results by using, in conventional baking procedures, a bread improver comprising an active agent physically associated with a protective material, the protective material being capable of being taken up by the liquid dough constituents during mixing of the dough to which the bread improver is added. The improved results obtained in accordance with the invention described in the aforesaid copending application arise because the protective material delays the action of the bread improver agent until the dough mixing operation has proceeded to a stage where a more or less uniform mixture of the dough ingredients has been made. Accordingly, when the bread improver agent begins to contribute its effect, the liquid constituents of the dough have already been uniformly distributed through the dough mixture.

The present invention provides an improved baking method, using bread improvers of the general type referred to, but characterized not only by a delay of the action of the bread improving agent but also by a gradual release of such activity. In general, I accomplish these results by employing a finely divided bread improver material the individual particles of which are physically connected to different amounts of the protective material.

Thus, in accordance with one embodiment of my invention, I may employ a quantity of a bread improver composition comprising a solid, particulate active agent, such as calcium peroxide, for example, some particles thereof being individually enveloped by a relatively thinner film of a protective material while other particles thereof are individually enveloped in a substantially thicker coating of protective material. When employing such a composition, those particles of bread improver agent which are protected by the thin coating come into action during an early stage of the dough mixing operation, while the action of those particles protected by the thicker coating is delayed until a later stage of the dough mixing operation.

The invention is applicable to a great many bread improver materials. Those materials to which the protective covering of the invention is applied can be any of the solid, particulate bread improver agents, particularly the inorganic bread improver compounds such as calcium peroxide, the phosphates of calcium and ammonium, particularly monocalcium phosphate, dicalcium phosphate, diammonium phosphate and mixtures thereof, the persulfates of calcium, potassium, sodium and ammonium, potassium bromate, potassium iodate, ammonium sulfate, calcium sulfate, ammonium chloride, sodium chlorite, and calcium carbonate.

The protective materials employed in accordance with the invention are, broadly, those edible materials which, while capable of firmly adhering to bread improver particles, are effectively removed from such particles, as by being dissolved or emulsified, when subjected to direct contact with aqueous fluids and to mechanical working. I have observed that particularly advantageous results are obtained when employing, as the protective material, one which is water-emulsifiable. It appears that such advantageous results occur because the emulsifiable materials, even though they be present in the form of a very thin coating, are not removed immediately upon contact with the aqueous phase of the dough but rather require both such contact and a substantial amount of mechanical working, as occurs during dough mixing.

In this connection, I have discovered a highly advantageous class of edible protective materials useful in accordance with the invention, such class consisting of lecithin, the monoglycerides having an iodine value not exceeding 50, mixed mono- and diglycerides with the mixture having an iodine value not exceeding 50, and the tartaric acid esters of mono- and diglycerides having an iodine value not exceeding 50. Thus, I find glyceryl monostearate, glyceryl monopalmitate and the mixed monoglycerides obtained commercially from lard, vegetable oils and edible fats, such mixtures having an iodine value not in excess of 50, to be excellent protective materials for use in accordance with the invention. Similarly, such monoglyceride esters as the diacetyl tartaric acid ester of glyceryl monostearate are particularly useful. On the other hand, those monoglycerides and glyceride mixtures having iodine values in excess of 50 are unsuitable because of their marked tendency to develop rancidity during storage prior to actual use. In this connection, it is to be noted that, in accordance with the invention, the protective material is employed in direct contact with various chemicals which tend, to a greater or lesser degree, to promote rancidity. Accordingly, such monoglyceride materials as those derived from soybean or cotton seed oil and having an iodine value in excess of 50, as well as those containing substantial proportions of oleic, linoleic, linolenic, or arachadonic acids, for example, are unsuitable. The presence of diglycerides in small quantities is not deleterious, so long as the diglyceride is stable and derived from a fatty acid of such nature that the iodine value of the total glyceride mixture is not in excess of 50.

The specially protected materials employed in accordance with the invention are particularly useful in multi-ingredient bread improver compositions, such as those comprising both an inorganic bread improver compound, such as calcium peroxide or dicalcium phosphate, for example, and an enzymatically active material. Suitable enzymatically active materials include the legume materials capable of both bleaching caratanoids and modifying dough properties. For example, such materials are the enzymatically active flours or meals obtained from soybeans, peas, peanuts, beans or lentils. Such materials may be fat-free, as is the case when the oil content has been extracted with a solvent such as hexane, or may contain all or a part of their natural fat content. Other sensitive materials useful in the improved compositions of the invention include the various commercial enzyme materials, and particularly the fungal enzyme concentrates.

When employing, in the method of this invention, bread improver compositions comprising both a specially protected inorganic bread improver compound, for example, and an enzymatically active material, the presence of the protective material on the inorganic compound serves to prevent or minimize deactivation of the enzyme content of the composition, as fully explained in the aforementioned copending application. Similarly, the presence of the protective material prevents or minimizes the formation of rancidity in the enzymatically active legume materials, when the composition employed includes a legume material having at least a substantial proportion of its natural fat content.

In addition to the various constituents hereinbefore mentioned, the bread improver compositions of the invention can include other materials which serve well known and conventional purposes. Particularly, it is frequently desirable to employ solid, particulate, edible diluents or extenders which serve to reduce the criticality of measurements during use of the compositions. Such materials also serve to decrease the contact between particles of the active ingredients. Especially useful diluents or extenders are corn flour, partially dextrinized corn flour, other cereal flours, starches, sugars and salt, or mixtures of such materials.

In accordance with one embodiment of the invention, I provide a bread improver composition, capable of progressively releasing its activity in the dough, by employing a quantity of particulate, solid bread improver material, a portion of which has been treated in such fashion as to lightly coat the particles with the protective material, and another portion of which has been treated to heavily coat the particles with protective material. Thus, assuming that the active bread improver agent is a particulate inorganic bread improver compound, I may treat that compound as follows: a dilute solution of a given protective agent in a volatile solvent is prepared and one-half of the amount of inorganic bread improver compound to be used is slurried with the dilute solution, so that a thin protective coating is applied thereto. The coated material is recovered, as by suction filtration, and dried. A concentrated solution of the same or a different protective material is then prepared and the remainder of the inorganic compound is slurried with the concentrated solution, recovered therefrom by filtering, and then dried. If an especially thick coating is desired, this portion of the compound can be treated a plurality of times, using a fully saturated solution of the protective material. The two coated products are then uniformly blended to provide the desired composition, one-half of which consists of particles individually enveloped in a relatively thin coating of protective material, the other half of which consists of particles individually enveloped in a relatively thicker protective coating. Alternatively, I may provide a composition of the general type described in my copending application Serial No. 745,173, filed concurrently herewith, where the fine particles of a bread improver agent are connected with larger particles of a normally solid protective material, some of the particles of bread improver agent being completely embedded in the protective material, some being only partially embedded and some being merely attached to the protective material. As pointed out in said copending application Serial No. 745,173, the protective material can be employed in an amount equal to ¼–2 times the weight of the bread improver agent.

The following examples are illustrative of the invention:

Example 1

A relatively dilute solution of protective material is prepared by dissolving, in 1,000 ml. of butanol, 40 grams of a distilled monoglyceride product (Myverol Type 18–30, produced by Distillation Products Industries, Rochester, N.Y.) prepared from edible animal fat having a minimum monoester content of 90%, an iodine value of approximately 40 and a congealing point of 58° C. Three hundred grams of finely divided food grade calcium peroxide (60% $CaO_2$, all finer than 100 mesh) is slurried with the monoglyceride solution for 10 minutes and then recovered by filtering with the aid of suction. The recovered product, dried at room temperature, amounts to 304–306 grams, so that 4–6 grams of the monoglyceride is deposited on the 300 grams of calcium peroxide as a relatively thin coating. Hereafter this material is referred to as Product A.

A similar, more concentrated monoglyceride solution is prepared by dissolving 160 grams of the same monoglyceride product in 2,000 ml. of butanol. Three hundred grams of untreated food grade calcium peroxide is slurried with one-half of such concentrated solution for 10 minutes, then recovered by filtering with the aid of suction. This coated product is then slurried with the remaining 1,000 ml. of the concentrated monoglyceride solution, filtered and dried. The finally recovered product, hereafter called Product B, amounts to 315–320 grams, 15–20 grams of the monoglyceride having been deposited on the particles as a coating substantially thicker than that applied to the first batch of calcium peroxide.

Equal quantities of the two coated products are combined and uniformly blended. A bread improver composition, hereafter called Product C, capable of being easily proportioned out by the baker, is prepared by blending the composite monoglyceride-coated calcium peroxide with partially dextrinized corn flour, as an extender, at the rate of 140 parts by weight of the calcium peroxide product to 9,860 parts by weight of the partially dextrinized corn flour. The formulation of this composition is such that addition thereof to a dough, at the rate of .375% by weight of the total flour employed in the dough will introduce to the dough approximately .003% by weight, on the same basis, of calcium peroxide.

A second bread improver composition, for use as a control, and called Product D, is prepared by blending thinly coated Product A with partially dextrinized corn flour, as an extender, at the rate of 140 parts by weight of the calcium peroxide product, 9,860 parts by weight of the corn flour.

A test bake is carried out by preparing two doughs, control dough 1 and test dough 2, each by the conventional sponge-dough procedure, in accordance with the following formulation:

| Sponge | Ingredient | Dough |
| --- | --- | --- |
| 450.0 grams | Flour | 250.0 grams. |
| 275.0 cc | Water | See below. |
| 17.5 grams | Yeast | |
| 2.0 grams | Yeast food | |
| | Milk solids | 21.0 grams. |
| | Salt | 14.0 grams. |
| | Sugar | 35.0 grams. |
| | Lard | 21.0 grams. |

To control dough 1, in the dough mixing stage, there is added a sufficient quantity of Product D to provide in the dough a proportion of calcium peroxide, computed as 100% calcium peroxide, equal to .003% of the flour weight. Similarly, there is added to the test dough 2, again in the dough mixing stage, a quantity of Product C sufficient to provide in the dough a proportion of calcium peroxide, computed as 100% calcium peroxide, equal to .003% of the total flour weight. Control dough 1 requires, to obtain a dough of satisfactory consistency, an amount of water in the dough mixing stage equal to 170–174 cc., or approximately 2% more water than would be required if no calcium peroxide at all were employed. Test dough 2 similarly requires the addition, in the dough mixing stage, of 175–179 cc. of water. Bread baked in conventional fashion from the two doughs, when compared by a skilled bread scorer, shows consistently better grain and texture, increased softness and increased volume in the loaves from test dough 2, as compared to the loaves from the control dough. It is thus evident that small, but significant, improvements in the well-known "calcium peroxide effect" are obtained with the use of Product C of this example, wherein the particles of calcium peroxide carry protective monoglyceride coatings of different thicknesses, so that the activity of the calcium peroxide is distributed more uniformly throughout the dough mixing period.

Example 2

A calcium peroxide composition, equivalent to Product C of Example 1, is prepared by blending uncoated calcium peroxide, the thinly coated calcium peroxide Product A of Example 1, and the thickly coated calcium peroxide Product B of Example 1, using 1 part by weight of each of the uncoated calcium peroxide and the thickly coated Product B, and 2 parts by weight of the thinly coated calcium peroxide Product A. The resulting composite calcium peroxide product is then blended with partially dextrinized corn flour, as an extender, at the rate of 140 parts by weight of the composite calcium peroxide product to 9,860 parts by weight of corn flour. In this composition, a more uniform distribution of the calcium peroxide activity, during dough mixing, is attained, the uncoated material beginning to act as soon as the ingredients are combined, and the coated products coming into effect sequentially during the dough mixing step.

Example 3

A composition similar to Product C of Example 1, but employing two different protective materials capable of being taken up by the liquid phase of the dough at different rates, is prepared as follows. For a first quantity of calcium peroxide, the procedure employed in preparing Product A of Example 1 is used, except that the monoglyceride material used is the commercially available diacetyl tartaric acid ester of glyceryl monostearate, which material is emulsifiable in water more quickly, with less mechanical working, than is the case with the distilled monoglyceride product employed in Example 1.

An equal quantity of calcium peroxide is coated with the distilled monoglyceride product of Example 1, employing the method disclosed for the preparation of Product B of that example.

The two coated products are blended together at the rate of 2 parts by weight of the tartaric acid ester-coated product to 1 part by weight of the distilled monoglyceride-coated product. The resulting blend is then mixed with partially dextrinized corn flour, as an extender, at the rate of 140 parts by weight of the calcium peroxide product to 9,860 parts by weight of the partially dextrinized corn flour.

I claim:

1. In the method for preparing baked goods including the steps of combining dough ingredients to form a dough mixture having an aqueous phase, and mechanically mixing the same to develop a completed dough, the improvement comprising introducing into such dough mixture a quantity of a finely particulate inorganic bread improver compound selected from the group consisting of calcium peroxide, the phosphates of calcium and ammonium, the persulfates of calcium, potassium, sodium and ammonium, potassium bromate, potassium iodate, ammonium sulfate, calcium sulfate, ammonium chloride, sodium chlorite and calcium carbonate, individual particles of said bread improver compound being physically directly connected to and at least partially covered by different amounts of a normally solid water-emulsifiable protective material comprising as its predominant ingredient at least one member of the group consisting of lecithin, monoglycerides having an iodine value not exceeding 50, mixed mono- and diglycerides having an iodine value not exceeding 50, and the tartaric acid esters of mono- and diglycerides having an iodine value not exceeding 50, said protective material being present in an effective amount in the range of from ¼ to twice the weight of said bread improver compound, whereby said quantity of bread improver compound is progressively released for contact with the aqueous phase of the dough during said mixing step, particles of said bread improver compound which are connected to greater amounts of said protective material being released only after other particles, connected to lesser amounts of said protective material, have already been released.

2. The improved method of claim 1 wherein some particles of said bread improver compound are individually enveloped in a relatively thinner continuous film of said protective material while other particles are individually enveloped in a relatively thicker continuous film of said protective material, all of said protective material being present in the form of films on said particles.

References Cited in the file of this patent
UNITED STATES PATENTS

| | | |
|---|---|---|
| 2,067,912 | Frey et al. | Jan. 19, 1937 |
| 2,132,436 | Reynolds et al. | Oct. 11, 1938 |
| 2,185,368 | Bowen | Jan. 2, 1940 |
| 2,288,410 | Lippman | June 30, 1942 |
| 2,321,673 | Hall | June 15, 1943 |

OTHER REFERENCES

"Chemicals by Glyco," 1944, Glyco Products Co., Inc. (Brooklyn, N.Y.), p. 33 (Modified Polyhydric Alcohol Esters-Glyceril Monostearate S).

"Chemicals by Glyco," 1944, Glyco Products Co., Inc. (Brooklyn, N.Y.), p. 35.

UNITED STATES PATENT OFFICE

CERTIFICATION OF CORRECTION

Patent No. 2,978,330                          April 4, 1961

Charles G. Ferrari

It is hereby certified that error appears in the above numbered patent requiring correction and that the said Letters Patent should read as corrected below.

In the grant lines 2 and 12, and in the heading to the printed specification, lines 3 and 4, name of assignee, for "J. B. Short Milling Company, each occurrence, read -- J. R. Short Milling Company --.

Signed and sealed this 22nd day of August 1961.

(SEAL)
Attest:

ERNEST W. SWIDER                        DAVID L. LADD
Attesting Officer                          Commissioner of Patents